(12) United States Patent
Han et al.

(10) Patent No.: US 8,194,092 B2
(45) Date of Patent: Jun. 5, 2012

(54) DEVICE AND METHOD OF PROCESSING IMAGE FOR POWER CONSUMPTION REDUCTION

(75) Inventors: Young Ran Han, Suwon-si (KR); Seung Sin Lee, Youngin-si (KR); Du-Sik Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 602 days.

(21) Appl. No.: 12/382,682

(22) Filed: Mar. 20, 2009

(65) Prior Publication Data
US 2010/0091029 A1    Apr. 15, 2010

(30) Foreign Application Priority Data
Oct. 10, 2008    (KR) .................. 10-2008-0099546

(51) Int. Cl.
- *G06T 15/60* (2006.01)
- *G09G 5/00* (2006.01)
- *H04N 5/57* (2006.01)
- *H04N 5/202* (2006.01)
- *H04N 1/46* (2006.01)
- *G03F 3/08* (2006.01)
- *G06K 9/40* (2006.01)
- *G06T 17/00* (2006.01)
- *G06K 9/00* (2006.01)
- *G06K 9/34* (2006.01)

(52) U.S. Cl. ........ 345/581; 345/617; 345/690; 345/426; 345/428; 348/603; 348/671; 358/516; 358/520; 358/448; 358/461; 382/165; 382/254; 382/176; 382/274

(58) Field of Classification Search .................. 345/426, 345/428, 581, 589, 600–601, 617–619, 690, 345/214; 348/602–603, 671–673, 687, 712; 358/516–520, 447–448, 461; 382/165, 254, 382/176, 274, 260, 276
See application file for complete search history.

(56) References Cited

U.S. PATENT DOCUMENTS

| | | | | |
|---|---|---|---|---|
| 6,011,635 A * | 1/2000 | Bungo et al. | .................. | 358/488 |
| 7,053,939 B2 * | 5/2006 | Lin et al. | ........................ | 348/239 |
| 2004/0042677 A1 * | 3/2004 | Lee | .............................. | 382/254 |
| 2005/0013502 A1 * | 1/2005 | Lim | .............................. | 382/254 |
| 2006/0274376 A1 * | 12/2006 | Bailey et al. | ................. | 358/3.26 |
| 2008/0030491 A1 * | 2/2008 | Kim et al. | ..................... | 345/207 |
| 2008/0032754 A1 * | 2/2008 | Kim et al. | ..................... | 455/574 |
| 2008/0253655 A1 * | 10/2008 | Liao et al. | ..................... | 382/176 |
| 2009/0257678 A1 * | 10/2009 | Chen | ............................. | 382/274 |
| 2010/0202027 A1 * | 8/2010 | Makino et al. | ............... | 358/520 |
| 2011/0169400 A1 * | 7/2011 | Seo et al. | ...................... | 313/504 |

FOREIGN PATENT DOCUMENTS

| | | |
|---|---|---|
| KR | 1020070080202 A | 8/2007 |
| KR | 1020070118547 A | 12/2007 |
| KR | 1020080010820 A | 1/2008 |

* cited by examiner

*Primary Examiner* — Wesner Sajous
(74) *Attorney, Agent, or Firm* — Staas & Halsey LLP

(57) ABSTRACT

An image processing method for reducing a power consumption. The image processing method may reduce the power consumption by classifying an input content into a conversion target region and a preservation target region and by converting a luminance of pixels included in the conversion target region. Also, the image processing method may effectively perform a luminance conversion for pixels by separating the input content into the conversion target region and the preservation target region based on a luminance of the pixels of the input content. The image processing method may convert the luminance of the pixels of the conversion target region to maintain a contrast between text pixels and background pixels.

17 Claims, 11 Drawing Sheets

DEVICE AND METHOD OF PROCESSING IMAGE FOR POWER CONSUMPTION REDUCTION

CROSS-REFERENCE TO RELATED APPLICATIONS

This application claims the benefit of Korean Patent Application No. 10-2008-0099546, filed on Oct. 10, 2008, in the Korean Intellectual Property Office, the disclosure of which is incorporated herein by reference.

BACKGROUND

1. Field

Example embodiments relate to an image processing technology for reducing a power consumption, and more particularly, to a technology that may reduce a power consumption of a display device using characteristics of an input content such as a web page, a document, and the like.

2. Description of the Related Art

Currently, increasing attention is directed to a display device using an active matrix organic light emitting diode (AM OLED), and the like.

Unlike a general liquid crystal display (LCD), a display device using an AM OLED may express a graduation of each of pixels according to an amount of supplied currents. Specifically, a greater amount of currents may need to be supplied to the pixels in order to express an image requiring a high luminance and thus a high power may be required. For example, a web page, a document, and the like may generally include a black text on a white background. In this instance, since this white background requires a high luminance, a relatively large amount of power may be consumed to express the web page, the document, and the like.

Accordingly, reducing the power consumption in this display device becomes a significant issue. In particular, there is a need for research that may appropriately express an input content including a black text on a white background to thereby reduce the power consumption.

SUMMARY

According to example embodiments, there is provided an image processing method for reducing a power consumption, the method including: identifying a conversion target region and a preservation target region in an input content based on a luminance of pixels of the input content; and converting a luminance of text pixels and background pixels of the conversion target region according to a predetermined standard. The standard may be applied to make the converted luminance of the text pixels be higher than the converted luminance of the background pixels.

According to example embodiments, there is provided an image processing device for reducing a power consumption, the device including: a quantization unit to compare the luminance of the pixels of the input content with a predetermined threshold to thereby quantize the luminance of the pixels of the input content to either a first luminance or a second luminance higher than the first luminance; a filtering unit to filter the quantized luminance of the pixels of the input content using a plurality of pre-designed filters, so that pixels included in the preservation target region may have the first luminance; a text erase unit to erase a text included in the conversion target region; and a luminance converter.

Example embodiments may provide an image processing method and device for reducing a power consumption that may classify an input content into a conversion target region and a preservation target region and convert a luminance of pixels of the conversion target region and thereby may reduce a power consumption of a display device.

Example embodiments may also provide an image processing method and device for reducing a power consumption that may perform a luminance conversion based on a pixel unit and thereby may express an input content at a low power consumption, without damaging original information of the input content.

Example embodiments may also provide an image processing method and device for reducing a power consumption that may perform a luminance conversion based on a pixel unit and thereby may independently use the converted luminance with respect to an operating system of a display device.

Example embodiments may also provide an image processing method and device for reducing a power consumption that may easily identify a conversion target region and a preservation target region using a luminance of pixels of an input content and may also convert a luminance of pixels included in the conversion target region using less resource.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of example embodiments will become apparent and more readily appreciated from the following description, taken in conjunction with the accompanying drawings of which.

DETAILED DESCRIPTION OF EMBODIMENTS

Figure 1:
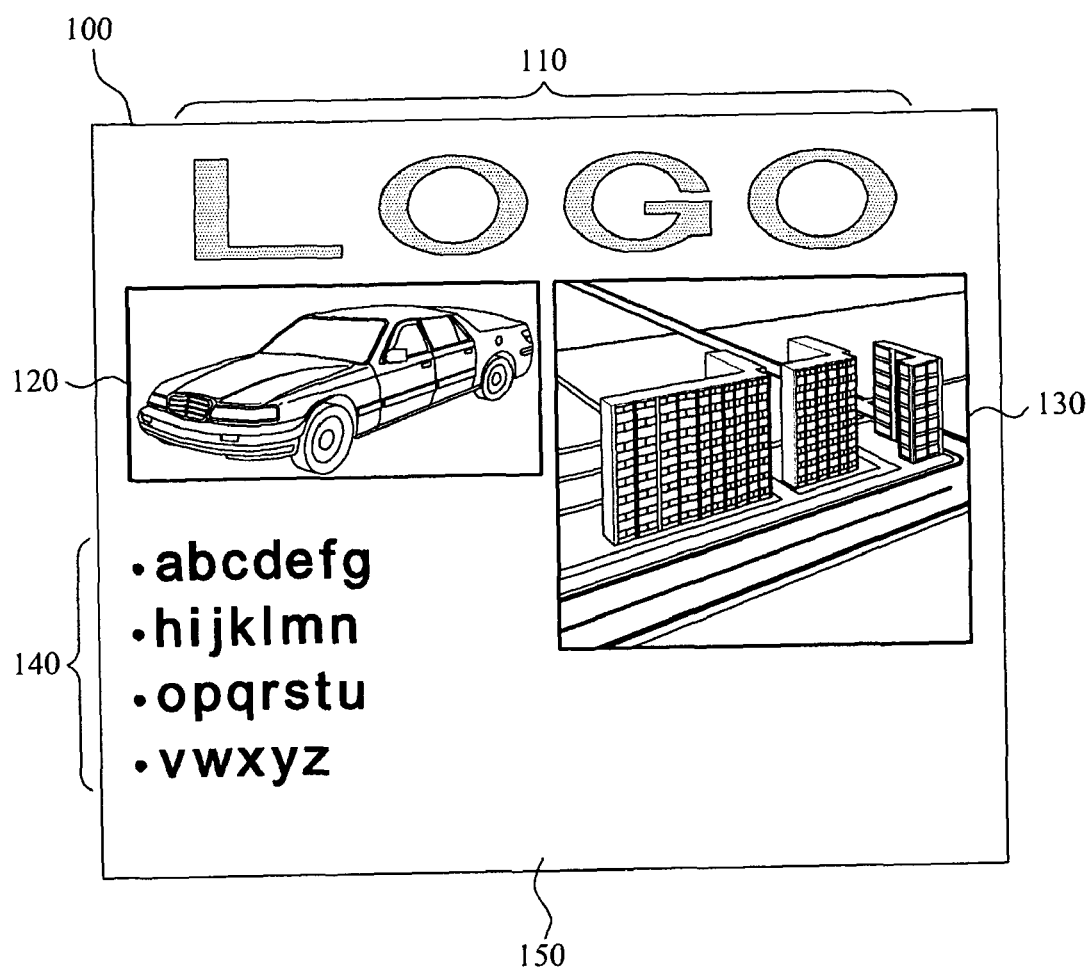
FIG. 1 is a diagram illustrating an input content according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 is a diagram illustrating an input content 100 according to example embodiments.

Referring to FIG. 1, an image of the input content 100 includes a logo 110, images 120 and 130, texts 140, and a background 150. Here, it is assumed that the logo 110 is in green, the texts 140 are in black, and the background 150 is in white.

The background 150 occupies a large portion in the input content 100. A relatively large amount of power may be required to express the color, here, the white color, of the background 150. Accordingly, there is a need to reduce a power consumption by converting the color of the background 150.

There may be many problems in changing the color of the background 150 by changing a source, for example, tag information and the like, of the input content 100. For example, since the logo 110 or the images 120 and 130 are generally formed in a square shape, a square-shaped distortion may occur around the logo 110 or the images 120 and 130 when changing the color of the background 150 using only the tag information. Schemes of changing the tag information may need to be different depending on an operating system of a display device.

According to example embodiments, an image processing method and device may classify the input content 100 into a conversion target region and a preservation target region and convert a luminance of pixels of the conversion target region based on a pixel unit. Through this, the image processing method and device may reduce a power consumption of a display device and express the input content 100 without damaging original information of the input content 100. The conversion target region may include the logo 110, the texts 140, and the background 150. The preservation target region may include the images 120 and 130.

Figure 2:
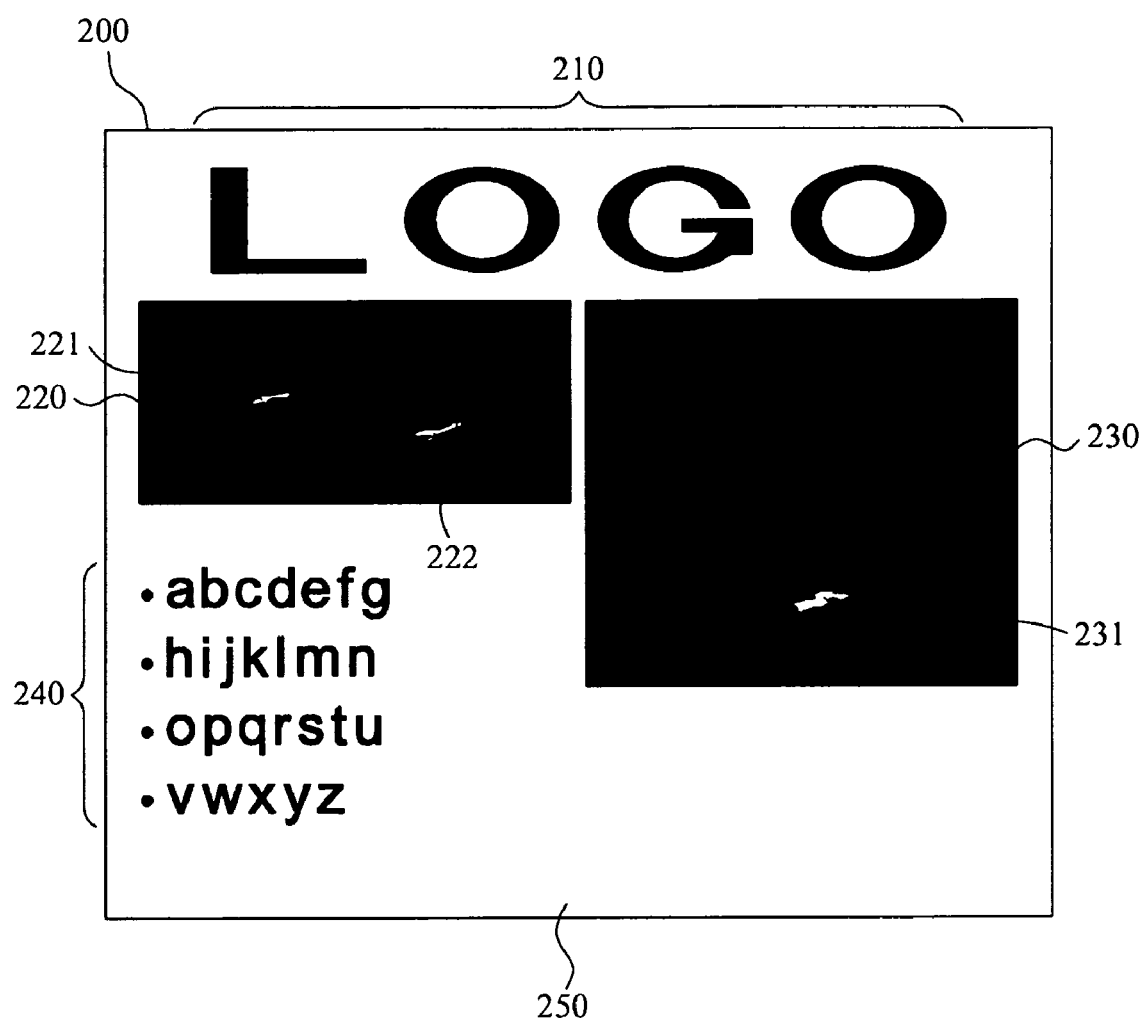
FIG. 2 is a diagram illustrating an input image of which a luminance of pixels is quantized according to example embodiments.

FIG. 2 is a diagram illustrating an input content 200 of which a luminance of pixels is quantized according to example embodiments.

Referring to FIG. 2, an image processing device according to example embodiments may classify the input content 200 into a conversion target region and a preservation target region by quantizing the luminance of pixels of the input content 200. The image processing device may perform a luminance conversion for pixels included in the conversion target region, instead of performing the luminance conversion for all the pixels of the input content 200. Here, the luminance of the pixels included in the conversion target region may be reversed, or may be converted according to a predetermined standard.

Since a color of images 220 and 230 of the input content 200 may need to be maintained, the images 220 and 230 may be classified into the preservation target region. Since a luminance of pixels, that is, text pixels, of texts 240, a luminance of pixels, that is, background pixels, of a background 250, and a luminance of pixels of a logo 210 may need to be reversed or converted in order to reduce a power consumption, the texts 240, the background 250, and the logo 210 may be classified into the conversion target region.

The image processing device may quantize a luminance of each of the pixels of the input content 200 to either a first luminance or a second luminance higher than the first luminance to thereby identify the conversion target region and the preservation target region in the input content 200.

For example, it is assumed that a red-green-blue (RGB) value of each pixel is any one of integers from zero to 255. In this instance, the image processing device may compare an original RGB value of each pixel with a predetermined threshold to quantize the original RGB value of each pixel to either zero or 255. Here, zero may correspond to the first luminance and a darkest value. 255 may correspond to the second luminance and a brightest value. Specifically, when the original RGB value is less than or equal to the threshold, the original RGB value may be quantized to zero. When the original RGB value is greater than the threshold, the original RGB value may be quantized to 255.

As described above, the luminance of each of the pixels of the input content 200 may be quantized to either the first luminance or the second luminance. In particular, when the threshold is set to be close to the brightest pixel luminance, for example, 255 in the above example, the color of the background 250 may be quantized to the white color and the color of the logo 210, the images 220 and 230, and the texts 240 may be quantized to the black color.

According to example embodiments, the image processing device may perform a luminance conversion for pixels having the second luminance, for example, 255 in the above example and may not perform the luminance conversion for pixels having the first luminance, for example, zero in the above example. Since the luminance conversion may not need to be later applied to the images 220 and 230 included in the preservation target region, the luminance of all the pixels of the images 220 and 230 may need to be quantized to the first luminance.

Here, a luminance of partial pixels among the pixels of the images 220 and 230 of which the luminance is quantized to the first luminance may be quantized to the second luminance. Specifically, referring to FIG. 2, the image 220 with the quantized luminance includes two image holes 221 and 222 and the quantized image 230 with the quantized luminance includes a single image hole 231. Pixels of the image holes 221, 222, and 231 may need to be appropriately processed to have the first luminance. It will be described in detail with reference to FIG. 3.

Figure 3:
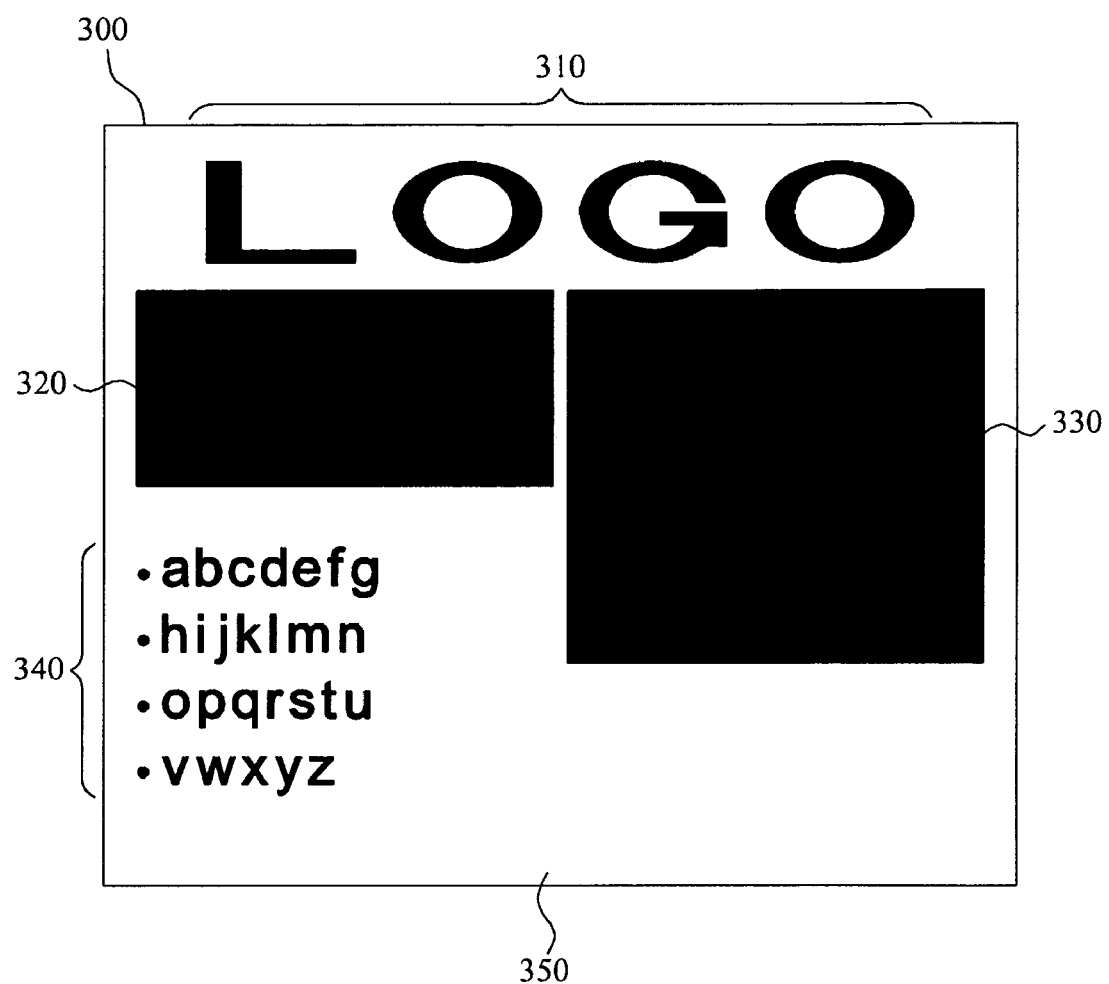
FIG. 3 is a diagram illustrating a result of performing filtering with respect to an image hole existing in a preservation target region according to example embodiments.

FIG. 3 is a diagram illustrating a result of performing filtering with respect to an image hole existing in a preservation target region according to example embodiments.

Referring to FIG. 3, the image holes 221, 222, and 231 shown in FIG. 2 have disappeared. Specifically, an image processing device according to example embodiments may process pixels of image holes to have a first luminance in order to prevent the change in a luminance of pixels of the images 320 and 330 through the luminance conversion process.

The image processing device may compare a particular pixel and adjacent pixels using a plurality of pre-designed filters and verify whether the particular pixel is the image hole. In particular, the image processing device may verify whether pixels of which a luminance is quantized to have a second luminance are the image hole and may not verify whether pixels of a luminance is quantized to have a first luminance are an image hole. Through this, a calculation amount may be reduced.

The filters may generate an output according to a particular function based on a luminance of the particular pixel and a luminance of the adjacent pixels. The output of the filters may be used to determine whether the particular pixel is the image hole.

The filters may be variously designed. For example, the filters may be differently designed depending on a number of the adjacent pixels and a configuration of the adjacent pixels.

The filters may be designed to have various types of functions. A performance associated with finding the image hole may be different based on the number of designed filters, characteristics thereof, and the like. The filters will be described later in detail with reference to FIG. 6.

Figure 4:
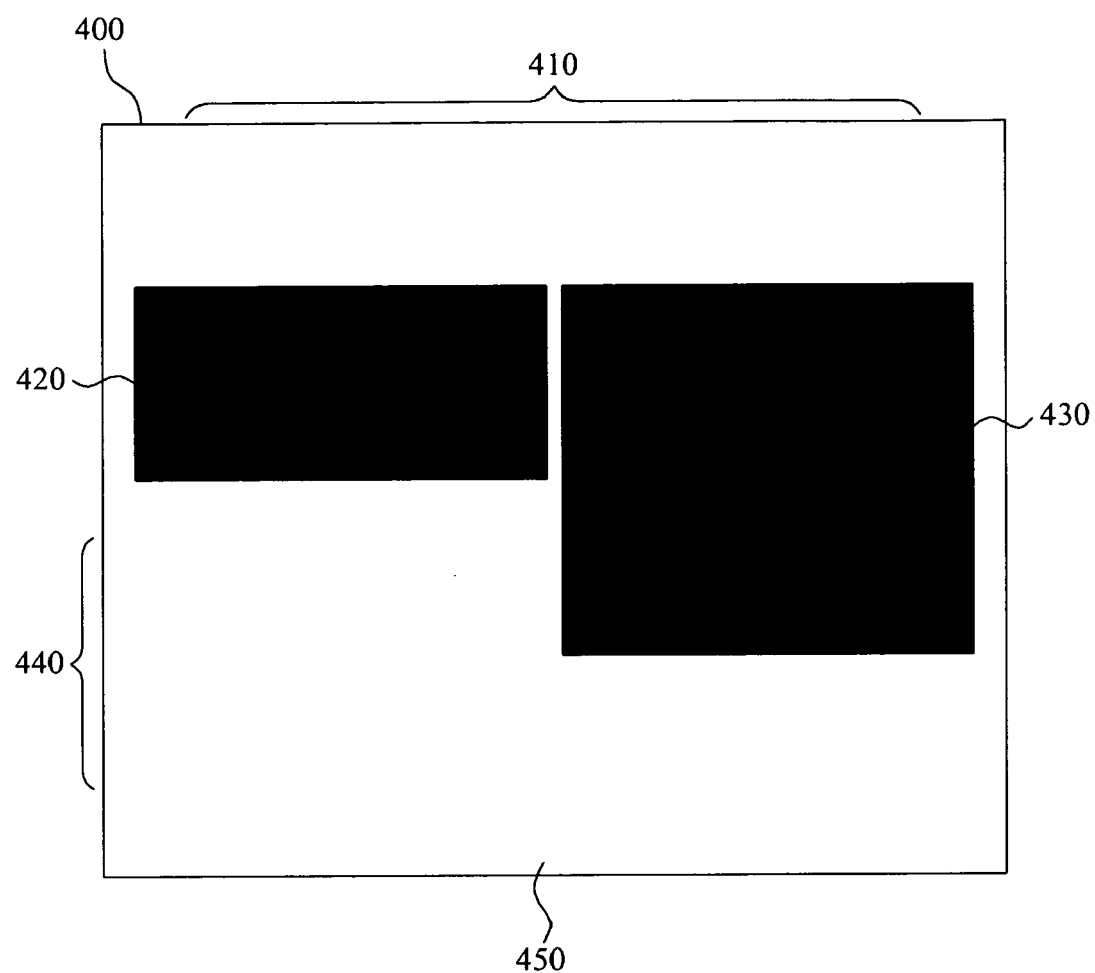
FIG. 4 is a diagram illustrating a result of erasing text pixels of a conversion target region according to example embodiments.

FIG. 4 is a diagram illustrating a result of erasing text pixels of a conversion target region according to example embodiments.

Referring to FIG. 4, all the pixels included in the conversion target region of an input content 400 have a white color and all the pixels included in images 420 and 430 classified into a preservation target region have a black color.

Specifically, an image processing device according to example embodiments may erase a logo 310 and texts 340 classified into the conversion target region from an input content 300 of FIG. 3. Accordingly, in FIG. 4, a logo 410 and texts 440 are erased in the input content 400.

In this instance, the image processing device may compare a particular pixel and adjacent pixels using a plurality of pre-designed filters and verify which the particular pixel is among the texts 440, the logo 410, and the images 420 and 430. The filters used to find a text or a logo will be described later with reference to FIG. 7.

In the input content 400, a luminance conversion may be performed for pixels that belong to the conversion target region and have a first luminance, for example, zero. The luminance conversion may not be performed for pixels that belong to the preservation target region and have a second luminance, for example, 255. Accordingly, the image processing device may simply identify the conversion target region and the preservation target region based on a luminance of pixels and may also more effectively apply the luminance conversion for the pixels of the conversion target region.

Figure 5:
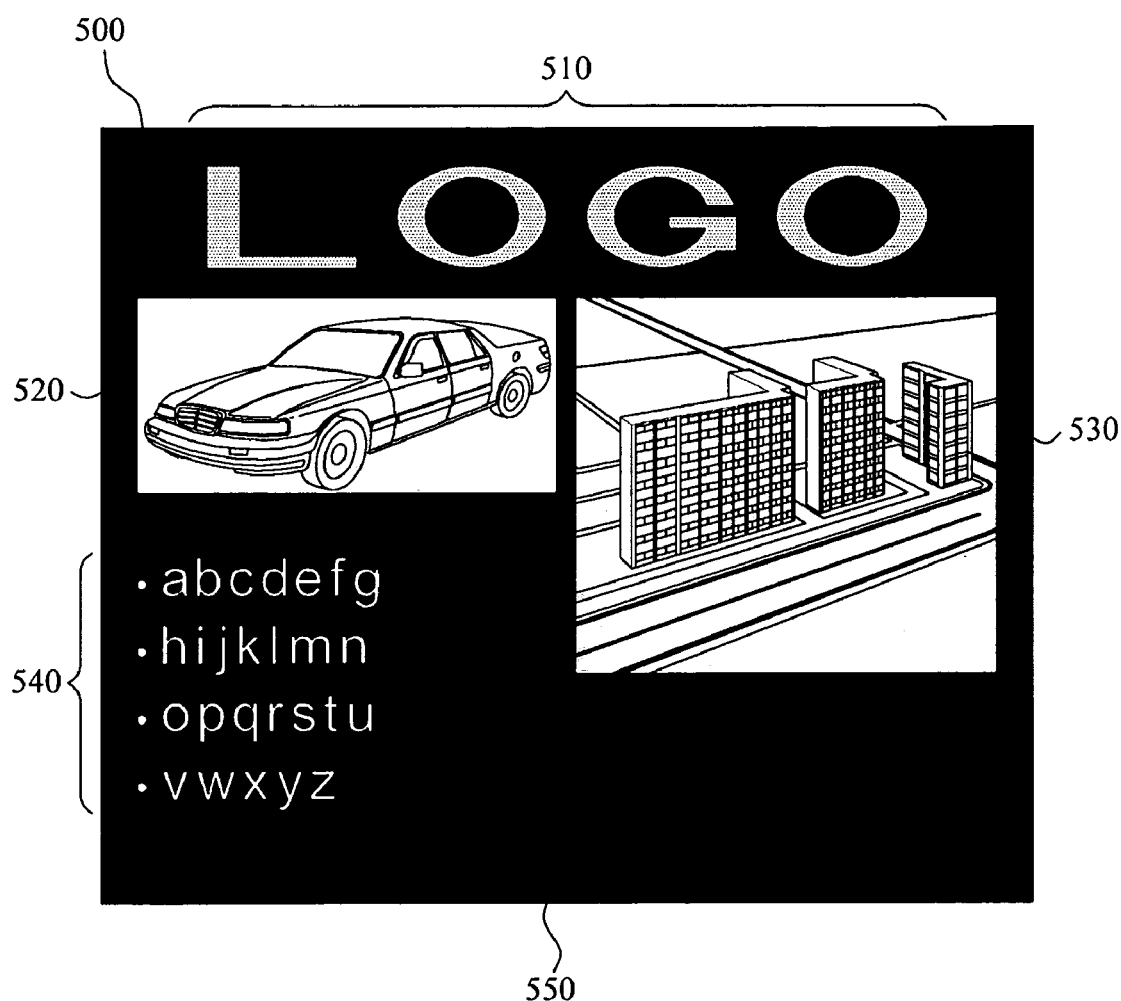
FIG. 5 is a diagram illustrating a result of converting a luminance of pixels of a conversion target region according to example embodiments.

FIG. 5 is a diagram illustrating a result of converting a luminance of pixels of a conversion target region according to example embodiments.

Referring to FIG. 5, as a result of converting the luminance of the pixels of the conversion target region, a luminance of pixels included in the remaining portions excluding images 520 and 530 of an input content 500 is converted. Specifically, the images 520 and 530 belong to a preservation target region that may need to maintain an original color, whereas a luminance of a logo 510, texts 540, and a background 550 is reversed or converted.

An image processing device according to example embodiments may perform a luminance conversion for pixels that belong to the conversion target region and have the second luminance, for example, 255 in the input content 400 of FIG. 4.

In this instance, the image processing device may convert an original RGB of each pixel to Hue, Saturation, Value (HSV) and extract V. The image processing device may convert the extracted V according to a predetermined standard to thereby acquire V'. When V is standardized to exist between zero and 1, for example, V' may be expressed by $(1-V)$ or $(1-V)^m$. V' may decrease as V increases.

According to example embodiments, the image processing device may define various types of standards based on a contrast between pixels constituting a logo or pixels constituting texts (hereinafter, text pixels), and background pixels. The image processing device may apply the standards in order to convert a luminance of the text pixels based on a saturation of the text pixels.

Generally, since the text pixels have a low luminance, almost zero, and the background pixels have a high luminance, although luminance-reversion standards such as $V'=(1-V)$ or $V=(1-V)^m$ where m is a real number adjustable by a user are applied to the text pixels and the background pixels, the contrast or a luminance contrast ratio may be secured.

When particular pixels, for example, the pixels constituting the logo, have a particular level of saturation and a high level of luminance, it is possible to decrease the contrast between the particular pixels and the background pixels by simply converting the luminance of the particular pixels. In this case, the image processing device may determine the luminance of the particular pixels based on the saturation of the particular pixels. For example, the image processing device may process pixels with a high luminance using a predetermined equation such as $V'=S$ where S denotes the saturation and thereby may achieve the contrast. Accordingly, when the logo 110 of FIG. 1 is in green having a high luminance, the logo 110 of FIG. 1 may be converted to the logo 510 of FIG. 5 that is in green having the high luminance.

Figure 6:
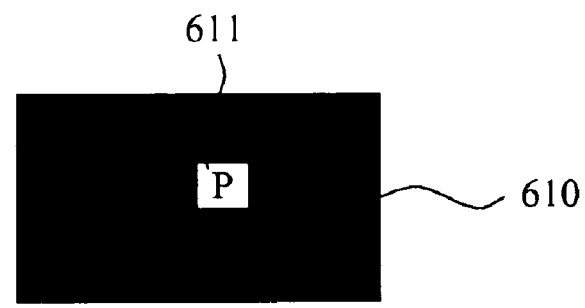
FIG. 6 is a diagram illustrating filters used to perform filtering with respect to an image hole according to example embodiments.
Figure 6:
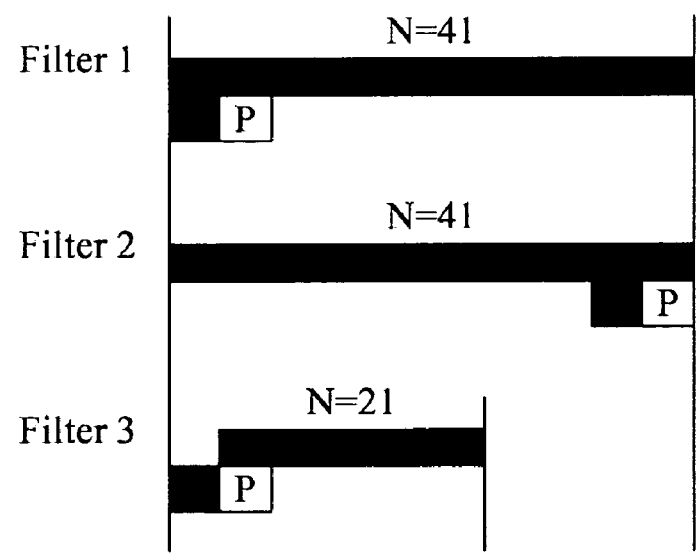
Figure 6:
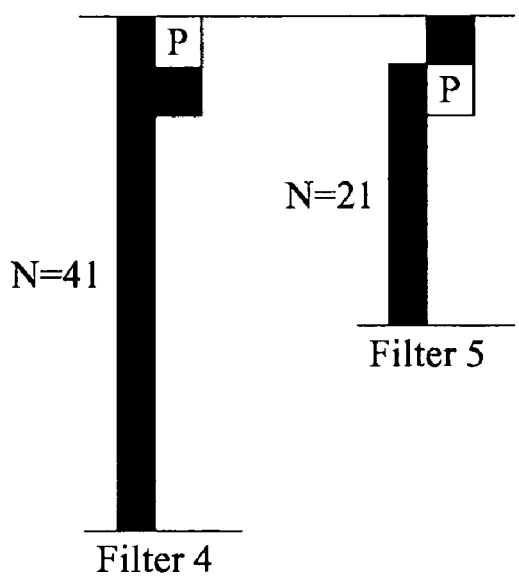

FIG. 6 is a diagram illustrating filters used to perform filtering with respect to an image hole according to example embodiments.

An image processing device according to example embodiments may filter pixels of which a luminance is quantized to have a second luminance and thereby may determine whether the pixels are the image hole. The size of the filters may be determined based on a number of filtered adjacent pixels. A shape of the filters may also be determined based on a configuration of the filtered adjacent pixels.

Each of the filters may generate a particular output according to its function by filtering a target pixel and the adjacent pixels. The particular output may be used to determine whether the target pixel is the image hole based on a pre-defined filter condition.

Referring to FIG. 6, a region 610 denotes a portion of an image that consists of target pixel P 611 and adjacent pixels.

Filter 1 and Filter 2 are in a horizontal shape. The size of Filter 1 and Filter 2 is 41 and thus Filter 1 and Filter 2 may filter 41 adjacent pixels. Filter 3 is also in the horizontal shape, but the size of Filter 3 is 21. Filter 4 and Filter 5 are in a vertical shape. The size of Filter 4 is 41 and the size of Filter 5 is 21.

The shape, the number, and the size of five one-dimensional filters, Filter 1, Filter 2, Filter 3, Filter 4, and Filter 5, shown in FIG. 6 may be variously designed. A scanning direction of the filters may also be variously determined. For example, the filters may perform filtering with scanning the target pixels from a left-upper end to a right-lower end of the region 610. Also, the filters may perform filtering with scanning the target pixels from the right-lower end to the left-upper end of the region 610.

Figure 7:
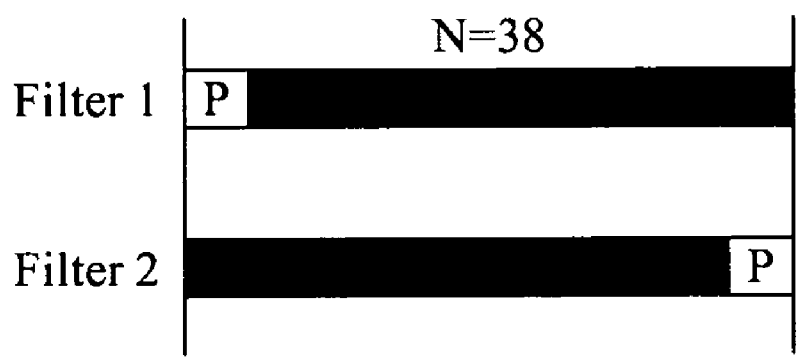
FIG. 7 is a diagram illustrating filters used to erase text pixels of a conversion target region according to example embodiments.
Figure 7:
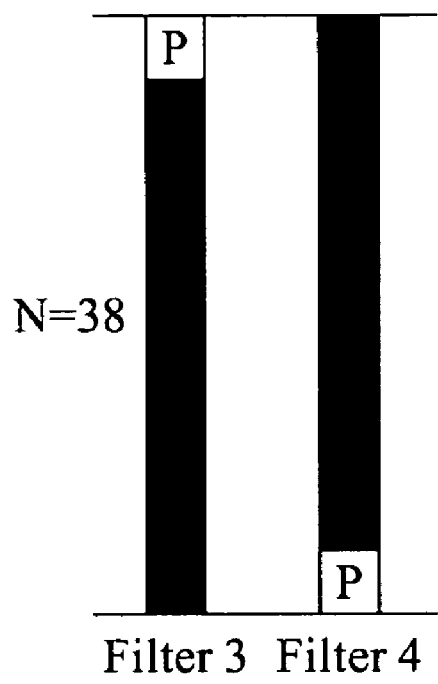
Figure 7:
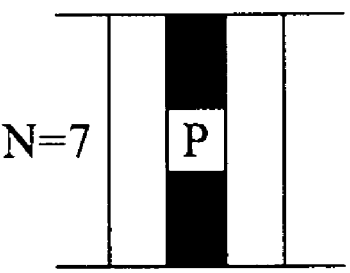
Figure 7:
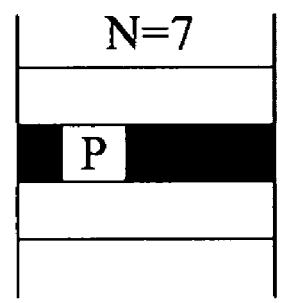

FIG. 7 is a diagram illustrating filters used to erase text pixels of a conversion target region according to example embodiments.

Referring to FIG. 7, six filters include four one-dimensional filters, Filter 1, Filter 2, Filter 3, and Filter 4, and two two-dimensional filters, Filter 5 and Filter 6.

The above six filters may be used to find, in an input content with a quantized luminance, texts or a logo corresponding to an erase target. An image processing device according to example embodiments may filter pixels having a first luminance to thereby determine whether the pixels are the erase target. For example, whether the target pixel is the erase target may be determined depending on whether at least one of outputs from the six filters satisfies a predetermined filter condition.

Those skilled in the art may variously design the shape, the number, and the size of filters as necessary and may also variously determine a scanning direction of the filters.

Figure 8:
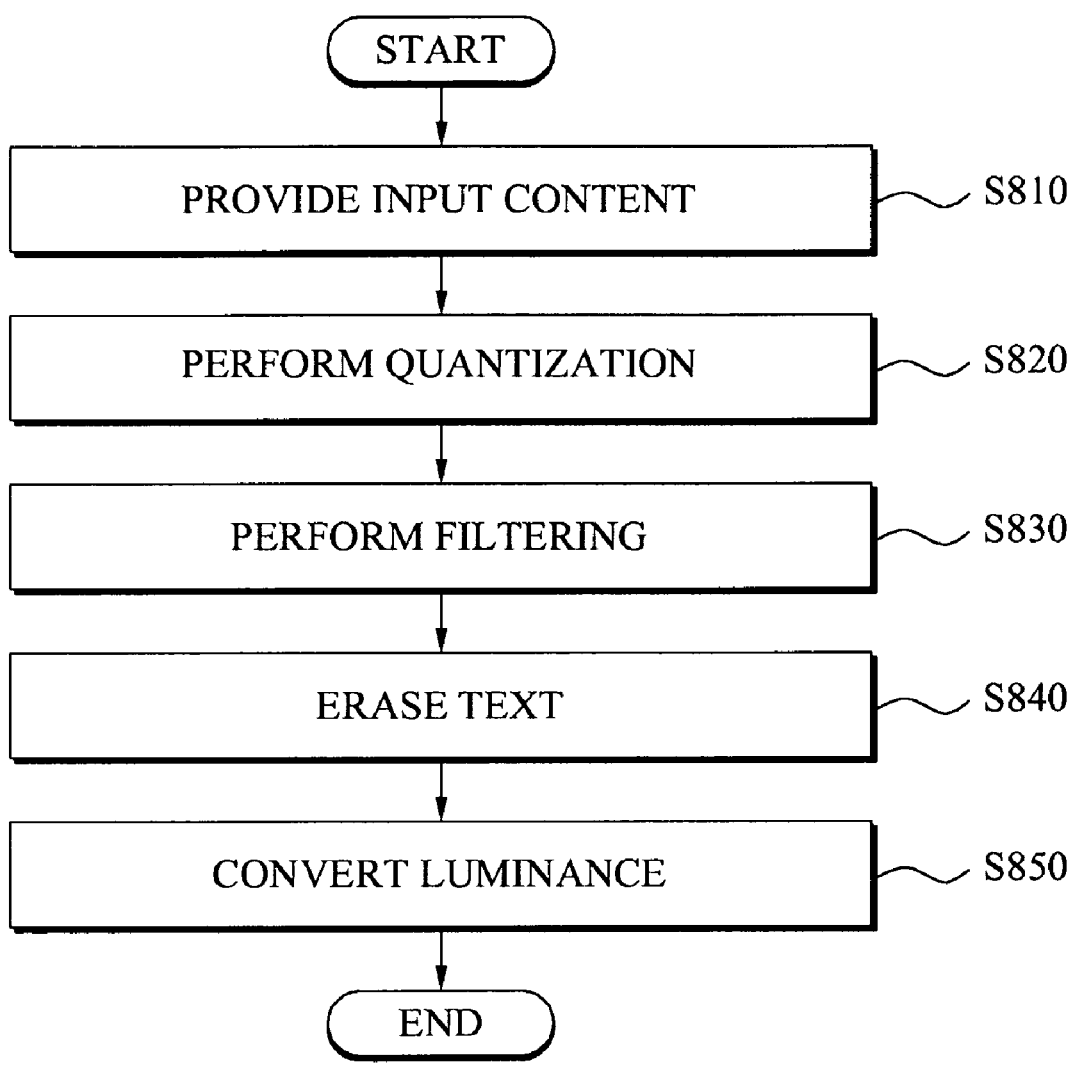
FIG. 8 is a flowchart illustrating an image processing method for reducing a power consumption according to example embodiments.

FIG. 8 is a flowchart illustrating an image processing method for reducing a power consumption according to example embodiments.

Referring to FIG. 8, in operation S810, the image processing method may provide an input content to an image processing device.

In operation S820, in order to classify the input content into a conversion target region and a preservation target region, the image processing method may compare a luminance of pixels of the input content with a predetermined threshold to quantize the luminance of the pixels of the input content to either a first luminance or a second luminance higher than the first luminance.

In operation S830, in order to convert a luminance of an image hole existing in the preservation target region to the second luminance, the image processing method may filter the quantized luminance of the pixels of the input content using a plurality of pre-designed filters.

In operation S840, the image processing method may erase a text included in the conversion target region.

In operation S850, the image processing method may convert a luminance of text pixels and background pixels of the conversion target region according to a predetermined standard, so that the luminance of the text pixels may be higher than the luminance of the background pixels.

According to example embodiments, the image processing method may convert the luminance of the text pixels and the background pixels of the conversion target region based on a contrast between the text pixels and the background pixels.

In particular, when the text pixels or pixels constituting a log have a high luminance and a particular level of saturation, the luminance of the text pixels may be converted according to the saturation of the text pixels. For example, as the saturation of the text pixels increases, the luminance of the text pixels may increase.

Figure 9:
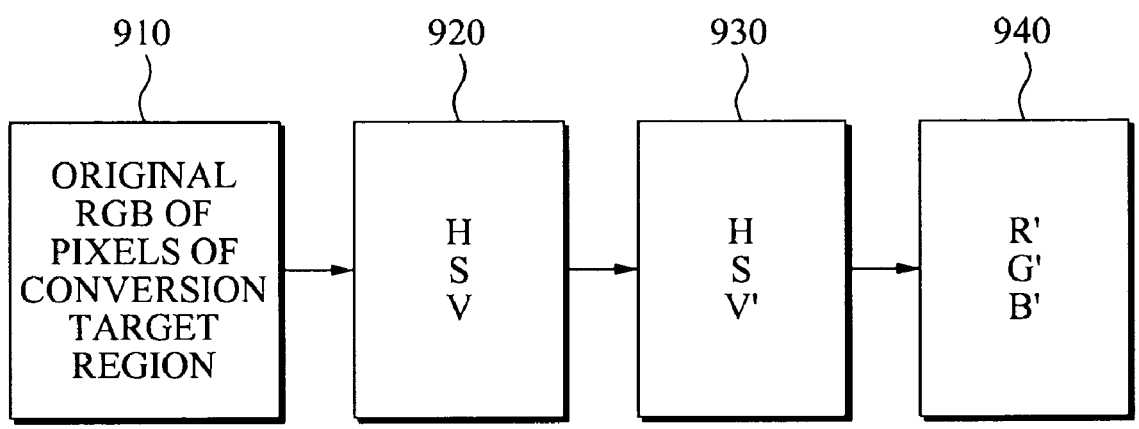
FIG. 9 is a diagram illustrating a process of converting a luminance according to example embodiments.

FIG. 9 is a diagram illustrating a process of converting a luminance according to example embodiments.

In this process, in operation 910, an image processing device according to example embodiments may extract an original RGB of pixels of a conversion target region. The image processing device may convert the original RGB to HSV in operation 920 and convert V to V' according to a predetermined standard in operation 930.

In operation 940, the image processing device may convert HSV' to new R'G'B' and provide, to a display device, an image signal corresponding to R'G'B'.

The image processing method for reducing the power consumption according to the above-described example embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Figure 10:
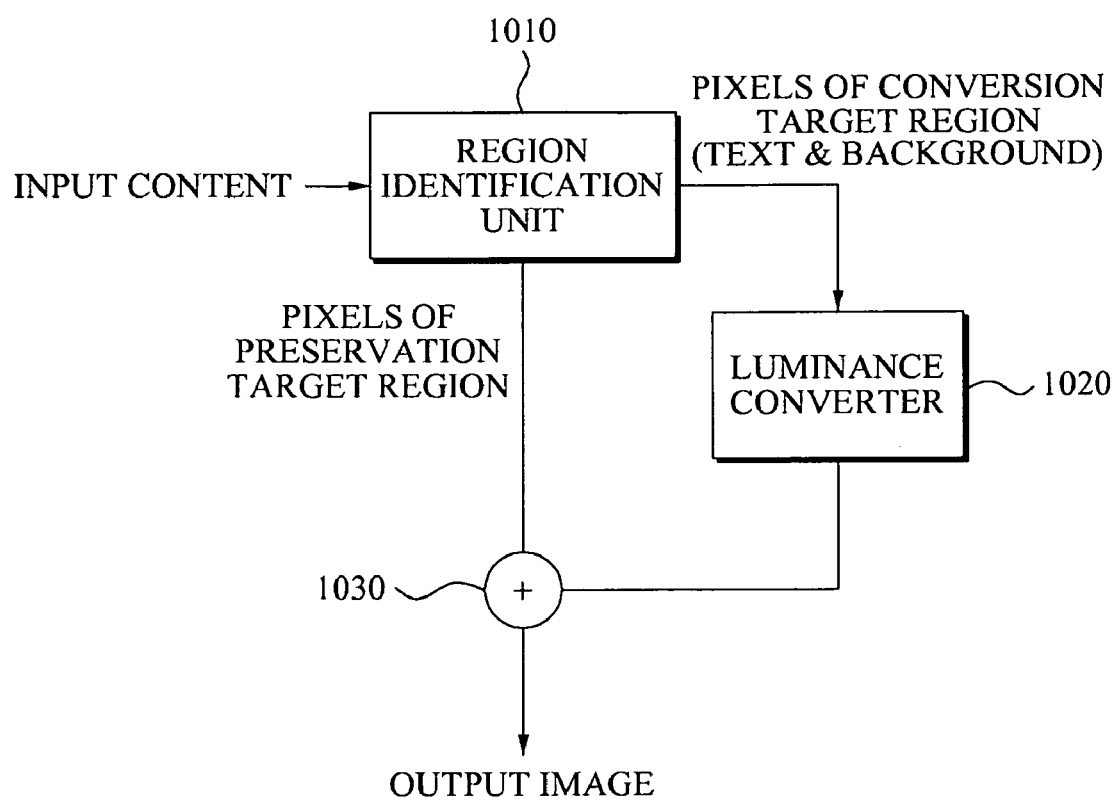
FIG. 10 is a block diagram illustrating an image processing device for reducing a power consumption according to example embodiments.

FIG. 10 is a block diagram illustrating an image processing device for reducing a power consumption according to example embodiments.

Referring to FIG. 10, the image processing device includes a region identification unit 1010, a luminance converter 1020 and an adder 1030.

The region identification unit 1010 may identify a conversion target region and a preservation target region in an input content based on a luminance of pixels included in the input content.

Figure 11:
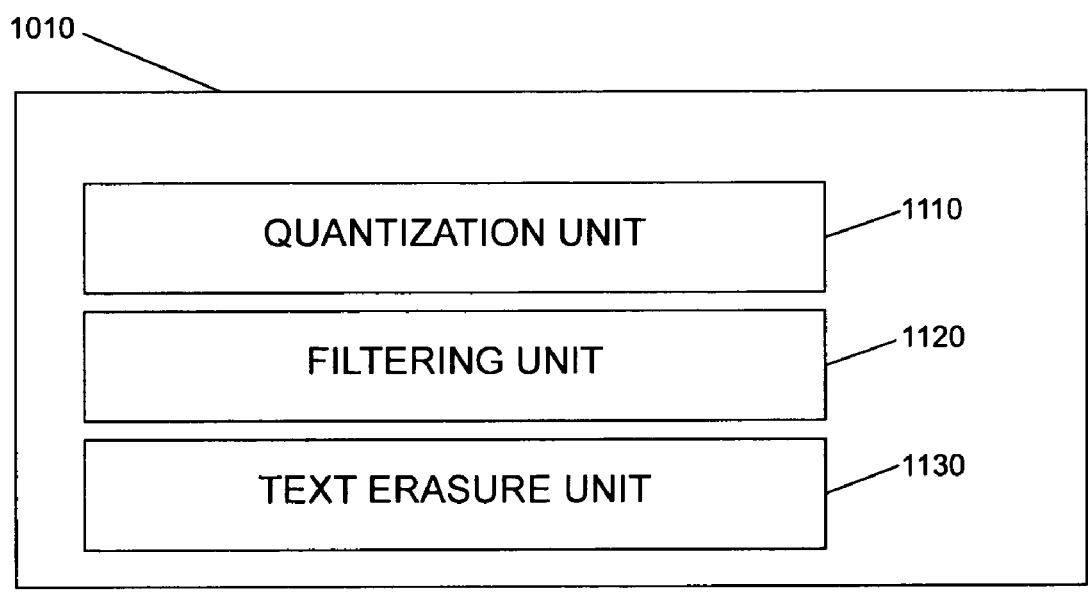
FIG. 11 is a block diagram illustrating a region identification unit according to example embodiments.

As shown in FIG. 11, the region identification unit 1010 may include a quantization unit 1110 to compare the luminance of the pixels of the input content with a predetermined threshold and quantize the luminance of the pixels of the input content to either a first luminance or a second luminance higher than the first luminance. Also, the region identification unit 1010 may include a filtering unit 1120 to filter the quantized luminance of the pixels of the input content using a plurality of pre-designed filters, so that pixels included in the preservation target region may have the first luminance; and a text erase unit 1130 to erase a text included in the conversion target region.

Also, the luminance converter 1020 may convert a luminance of text pixels and background pixels of the conversion target region according to a predetermined standard. Descriptions made above with reference to FIGS. 1 through 9 may be applicable to the luminance converter 1020 as is and thus further detailed descriptions related thereto will be omitted here.

Also, the adder 1030 creates an output image including the conversion target region and the preservation target region with the converted luminance.

The image processing method and device according to example embodiments may be applicable for an active matrix organic light emitting diode (AM OLED).

Although a few example embodiments have been shown and described, the present disclosure is not limited to the described example embodiments. Instead, it would be appreciated by those skilled in the art that changes may be made to these example embodiments without departing from the principles and spirit of the disclosure, the scope of which is defined by the claims and their equivalents.

What is claimed is:

1. An image processing method for reducing a power consumption, the method comprising:
    identifying, by a processor, a conversion target region and a preservation target region in an input content based on a quantization of a luminance of pixels of the input content; and
    converting a luminance of text pixels and background pixels of the conversion target region according to a predetermined standard,
    wherein the converted luminance of the text pixels is higher than the converted luminance of the background pixels.

2. The method of claim 1, wherein the converting converts the luminance of the text pixels and the background pixels of the conversion target region based on a contrast between the text pixels and the background pixels.

3. An image processing method for reducing a power consumption, the method comprising:
    identifying, by a processor, a conversion target region and a preservation target region in an input content based on a quantization of a luminance of pixels of the input content; and
    converting a luminance of text pixels and background pixels of the conversion target region according to a predetermined standard, wherein the converted luminance of the text pixels is higher than the converted luminance of the background pixels, wherein the converting converts the luminance of the text pixels and the background pixels of the conversion target region, so that the luminance of the text pixels are adjusted according to a saturation of the text pixels.

4. The method of claim 3, wherein the converted luminance of the text pixels increases as the saturation of the text pixels increases.

5. The method of claim 1, wherein the identifying comprises:

comparing the luminance of the pixels of the input content with a predetermined threshold to quantize the luminance of the pixels of the input content to either a first luminance or a second luminance, and the conversion target region and the preservation target region are identified according to the quantized luminance of the pixels of the input content.

6. The method of claim 5, wherein:

the pixels of the conversion target region have the second luminance, and the converting comprises converting the luminance of the pixels of the conversion target region having the second luminance according to the standard.

7. The method of claim 1, further comprising:

creating an output image including the conversion target region and the preservation target region with the converted luminance.

8. The method of claim 5, wherein the identifying comprises:

filtering the quantized luminance of the pixels of the input content using a plurality of pre-designed filters, so that pixels included in the preservation target region have the first luminance.

9. The method of claim 8, wherein the filtering comprises:

filtering pixels of which the luminance is quantized to have the second luminance, among the pixels of the input content, so that the pixels included in the preservation target region have the first luminance.

10. The method of claim 8, wherein the identifying comprises:

erasing a text included in the conversion target region.

11. The method of claim 1, wherein pixels of the preservation target region maintain their original color.

12. The method of claim 1, wherein the image processing method for reducing the power consumption is applicable for an active matrix organic light emitting diode (AM OLED).

13. A computer-readable recording medium storing a program for implementing the method of claim 1.

14. An image processing device for reducing a power consumption, the device comprising:

a region identification unit to identify a conversion target region and a preservation target region in an input content based on a quantization of a luminance of pixels of the input content; and a luminance converter to convert a luminance of text pixels and background pixels of the conversion target region according to a predetermined standard, and wherein the converted luminance of the text pixels is higher than the converted luminance of the background pixels.

15. The device of claim 14, wherein the luminance converter converts the luminance of the text pixels and the background pixels of the conversion target region based on a contrast between the text pixels and the background pixels.

16. The device of claim 14, wherein the luminance converter converts the luminance of the text pixels and the background pixels of the conversion target region, so that the luminance of the text pixels are adjusted according to a saturation of the text pixels.

17. The device of claim 14, wherein the region identification unit comprises:

a quantization unit to compare the luminance of the pixels of the input content with a predetermined threshold to thereby quantize the luminance of the pixels of the input content to either a first luminance or a second luminance;

a filtering unit to filter the quantized luminance of the pixels of the input content using a plurality of pre-designed filters, so that pixels included in the preservation target region have the first luminance; and a text erase unit to erase a text included in the conversion target region.

* * * * *